(12) United States Patent
Gupta

(10) Patent No.: US 8,245,124 B1
(45) Date of Patent: Aug. 14, 2012

(54) CONTENT MODIFICATION AND METADATA

(75) Inventor: Amit Gupta, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1036 days.

(21) Appl. No.: 12/052,333

(22) Filed: Mar. 20, 2008

(51) Int. Cl.
*G06F 17/00* (2006.01)

(52) U.S. Cl. ...................................... 715/202

(58) Field of Classification Search .................. 715/201, 715/202
See application file for complete search history.

(56) References Cited

U.S. PATENT DOCUMENTS

| | | | | |
|---|---|---|---|---|
| 4,409,618 A * | 10/1983 | Inaba et al. | ............ | 348/590 |
| 5,592,602 A * | 1/1997 | Edmunds et al. | ............ | 345/474 |
| 6,928,613 B1 * | 8/2005 | Ishii et al. | ............ | 715/726 |
| 6,970,639 B1 * | 11/2005 | McGrath et al. | ............ | 386/290 |
| 7,020,381 B1 * | 3/2006 | Kato et al. | ............ | 386/280 |
| 7,349,578 B2 | 3/2008 | Edwards et al. | | |
| 7,644,364 B2 * | 1/2010 | Patten et al. | ............ | 715/726 |
| 2002/0001450 A1 * | 1/2002 | Tabuchi et al. | ............ | 386/52 |
| 2002/0057894 A1 * | 5/2002 | Ishige | ............ | 386/46 |
| 2002/0069204 A1 * | 6/2002 | Kahn et al. | ............ | 707/10 |
| 2002/0114613 A1 * | 8/2002 | Thai | ............ | 386/52 |
| 2005/0086069 A1 * | 4/2005 | Watson et al. | ............ | 705/1 |
| 2005/0129111 A1 * | 6/2005 | Kurceren et al. | ........ | 375/240.03 |
| 2005/0188319 A1 * | 8/2005 | Shinkai | ............ | 715/751 |
| 2006/0053374 A1 * | 3/2006 | Wilensky | ............ | 715/716 |
| 2006/0093309 A1 * | 5/2006 | Herberger et al. | ............ | 386/46 |
| 2006/0244845 A1 | 11/2006 | Craig et al. | | |
| 2007/0035665 A1 * | 2/2007 | Khare et al. | ............ | 348/586 |
| 2007/0189377 A1 * | 8/2007 | Taylor et al. | ............ | 375/240 |
| 2007/0192353 A1 * | 8/2007 | Wang et al. | ............ | 707/102 |
| 2007/0283382 A1 * | 12/2007 | Boston et al. | ............ | 725/32 |
| 2008/0012988 A1 * | 1/2008 | Baharav et al. | ............ | 348/586 |
| 2008/0052612 A1 * | 2/2008 | Hwang et al. | ............ | 715/201 |
| 2008/0131010 A1 * | 6/2008 | Wilensky | ............ | 382/238 |
| 2008/0247726 A1 * | 10/2008 | Lee et al. | ............ | 386/52 |
| 2008/0256086 A1 * | 10/2008 | Miyoshi et al. | ............ | 707/10 |
| 2008/0285939 A1 * | 11/2008 | Baum et al. | ............ | 386/52 |
| 2009/0070674 A1 * | 3/2009 | Johnston | ............ | 715/716 |
| 2009/0119375 A1 * | 5/2009 | Shenfield | ............ | 709/206 |
| 2009/0122196 A1 * | 5/2009 | Chung | ............ | 348/586 |
| 2009/0142030 A1 * | 6/2009 | Lee et al. | ............ | 386/52 |
| 2009/0195663 A1 * | 8/2009 | Perotti et al. | ............ | 348/207.99 |
| 2009/0199090 A1 * | 8/2009 | Poston et al. | ............ | 715/255 |

(Continued)

OTHER PUBLICATIONS

Kaiser et al., Metadata-based Adaptive Assembling of Video Clip on the Web, IEEE 2007, pp. 9-14.*

(Continued)

*Primary Examiner* — Cong-Lac Huynh
(74) *Attorney, Agent, or Firm* — Kilpatrick Townsend & Stockton LLP

(57) ABSTRACT

A content manager receives digital content. The content manager modifies original digital content in accordance with a set of effects to produce modified digital content. Application of the set of effects modifies how the digital content is subsequently played back by one or more media player applications. In addition to applying effect, the content manager creates metadata identifying the set of effects applied to the original digital content to produce the modified digital content. The content manager then initiates distribution of the modified digital content and the corresponding metadata over a network. The metadata associated with the digital content identifies the set of effects applied to the received digital content prior to the distribution. Accordingly, other entities in a network environment can identify which effects have been applied to a corresponding set of digital content.

25 Claims, 10 Drawing Sheets

U.S. PATENT DOCUMENTS

2010/0027958 A1* 2/2010 Ubillos .......................... 386/4
2012/0084529 A1* 4/2012 Nonaka et al. ................ 711/165

OTHER PUBLICATIONS

Nishimoto et al., Advanced Conditional Access System for Digital Broadcasting Receivers Using Metadata, IEEE 2007, pp. 697-672.*
Chang et a., Secure Transcoding of Internet Content, Google 2002, pp. 1-4.*
Walland et al., The Application of Intimate Metadata in Post Production, Google 2002, pp. 1-10.*
Hanjalic et al., An Integrated Scheme for Automated Video Abstraction Based on Unsupervised Cluster-Validity Analysis, IEEE 1999, pp. 1280-1289.*
Lienhart et al., Video Abstracting, ACM 1997, pp. 54-63.*
Casares et al., Simplifying Video Editing Using Metadata, ACM 2002, pp. 157-166.*
Agamanolis et al., Viper: A Framework for Responsive Television, IEEE 2003, pp. 88-98.*

\* cited by examiner

900

910
RECEIVE FIRST DIGITAL CONTENT AND FIRST METADATA FROM A FIRST REMOTE SOURCE OVER A NETWORK CONNECTION, THE FIRST METADATA IDENTIFYING A SET OF PLAYBACK EFFECTS APPLIED TO AN ORIGINAL SET OF CONTENT TO PRODUCE THE FIRST DIGITAL CONTENT

920
IN RESPONSE TO RECEIVING A COMMAND TO APPLY THE SET OF PLAYBACK EFFECTS TO SECOND DIGITAL CONTENT, PRODUCE A MODIFIED VERSION OF THE SECOND DIGITAL CONTENT IN ACCORDANCE WITH THE SET OF PLAYBACK EFFECTS AS IDENTIFIED BY THE FIRST METADATA

930
INITIATE DISTRIBUTION OF THE MODIFIED VERSION OF THE SECOND DIGITAL CONTENT AND SECOND METADATA TO A SECOND REMOTE SOURCE OVER THE NETWORK CONNECTION, THE SECOND METADATA IDENTIFYING PLAYBACK EFFECTS APPLIED TO THE SECOND DIGITAL CONTENT PRIOR TO THE DISTRIBUTION

*FIG. 9*

CONTENT MODIFICATION AND METADATA

BACKGROUND

The world-wide-web has dramatically changed over the past several years. It is now easier than ever for persons all around the world to communicate with each other and exchange personal information.

For example, YouTube™ is a video sharing website where users can upload, view, and share video clips with each other. Such a service uses Adobe Flash™ technology to display a wide variety of video content, including movie clips, television clips and music videos, as well as amateur content such as videoblogging and short original videos.

Unregistered users associated with the You Tube™ website can watch most videos on the site, while registered users are permitted to upload an unlimited number of videos.

It is known in the art that various playback effects can be applied to digital content such as digital video, digital photography, digital audio, graphics, etc., prior to distribution of the digital content in a manner as discussed above. Examples of playback effects that can be applied to digital content include techniques such as adding borders to the digital content, adding one or more color filters to the digital content, and adding textures to the digital content.

SUMMARY

Conventional methods of managing and applying effects to digital content suffer from a number of deficiencies. For example, as previously discussed, the web enables users to download video content to a publicly accessible server such as You-Tube™ for distribution to others. Prior to the distribution, the user can modify original content to include effects so that the content is more appealing. In general, effects may include graphical, visual, audio, or other modifications to the content. Making the content more appealing to viewers will increase the likelihood that the content will be downloaded and viewed by more people. Typically, users that upload content to the You-Tube™ service derive great satisfaction from knowing that his or her uploaded content was downloaded and viewed by so many people.

Upon viewing digital content downloaded from a server, a viewer downloading the content may wish to apply the same or similar effects of the downloaded content to his or her own digital content. Unfortunately, according to conventional methods, it can be difficult to identify and/or recreate the set of effects from the downloaded content. For example, determining which effects were applied to original digital content to produce the viewed digital content may be accomplished through a time-consuming trial and error process. Such a process can be especially complicated and time-consuming in situations where the order of applying such effects is critical. In certain cases, it may be impossible to identify what effects were applied to content to achieve a certain look and feel.

Techniques discussed herein may overcome some of the deficiencies of conventional techniques for managing digital content and tracking changes associated with content such as audio data, video data, etc. For example, as will be discussed further, certain specific embodiments herein are directed to modifying digital content: 1) to produce modified digital content and corresponding metadata that identifies particular effects that were applied to produce the modified digital content, and 2) to distribute the metadata along with the modified digital content over a network. After being distributed to entities such as other users, the metadata can be used by the other users to identify a set of effects already applied to digital content. Thus, users can apply the identified set of effects, as specified by the metadata, to other content.

If desired, the set of one or more effects as identified by the metadata can be altered before application to other digital content. In other words, a user can select which effects associated with received digital content will be applied to his or her content.

More specifically, according to one embodiment, a content manager receives digital content. The content manager modifies the digital content in accordance with a set of effects to produce modified digital content. The application of the set of effects modifies how the digital content is subsequently played back by one or more media player applications. The content manager creates metadata to identify the set of effects used to produce the modified digital content. The content manager initiates distribution of the modified digital content and metadata over a network. Based on the metadata, other entities in a network environment can easily identify which effects have been applied to produce corresponding digital content.

If desired, an entity such as a user can apply the set of effects associated with received content to selected content such as his or her content prior to distribution. For example, in accordance with another embodiment, an entity can receive first digital content and first metadata from a first remote source over a network connection. As previously discussed, the first metadata can identify a set of playback effects applied to an original set of content to produce the first digital content. In response to receiving a command to apply the set of playback effects to second digital content, the content manager produces a modified version of the second digital content in accordance with the set of playback effects as identified by the first metadata. The content manager creates second metadata containing the playback effects applied to the second content and associates the second metadata with the modified version of the second digital content. Thus, the second metadata identifies playback effects applied to the second digital content prior to its distribution. The content manager then initiates distribution of the modified version of the second digital content and second metadata to a second remote source over the network connection.

In this way, entities such as users in a network environment can benefit from reusing the same sets of effects applied to received content for application of the effects to different content for subsequent distribution over the network. For instance, distribution and/or re-distribution of the metadata serves as a way for others to apply the same desirable effects to other content without the burden of having to identify a set of effects by trial and error, which may be impossible.

Note that in addition to the embodiments as discussed above, other embodiments herein can include a configuration of one or more computerized devices, websites, servers, hosted services, workstations, handheld or laptop computers, or the like to carry out and/or support any or all of the method operations disclosed herein. In other words, one or more computerized devices or processors can be programmed and/or configured to include a content manager and/or related functions as explained herein to carry out different embodiments of the invention. Yet other embodiments herein include software programs to perform any of the method embodiment steps and operations summarized above and disclosed in detail below.

It is to be understood that each of the systems, methods, and apparatuses herein can be embodied strictly as a software program, as a hybrid of software and hardware, or as hardware alone such as within a processor, or within an operating system or within a software application, or via a non-software application such a person performing all or part of the operations. Example embodiments of the invention may be implemented in products and/or software applications such as those manufactured by Adobe Systems Incorporated of San Jose, Calif., USA.

As discussed above, techniques herein are well suited for use in software applications supporting management of digital content. However, it should be noted that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIGS. 7-10 are flowcharts illustrating example operations for managing digital content according to embodiments disclosed herein.

DETAILED DESCRIPTION

In one embodiment, a content manager retrieves digital content as selected by a entity such as a user. Digital content as referenced herein can include, without limitation, data already in a format for playback by a respective media player. The digital content defines a respective sensory experience for consumption by an entity that plays back the digital content to a user. Digital content as referenced herein also can include, without limitation, any data that is not yet in a form for playback by a respective media player. For example, the digital content can be any data that is modified, incorporated into, or combined with other digital data such that produced digital content is eventually playable by a respective media player.

After retrieving selected content, the content manager modifies the retrieved digital content in accordance with a set of effects to produce modified digital content. Application of the set of effects modifies how the digital content is subsequently played back by one or more media player applications, for example. In one embodiment, the content manager keeps track of which set of one or more effects were applied to produce the modified digital content and stores such information as metadata.

The content manager then initiates distribution of the modified digital content and the metadata over a network such as the Internet. As mentioned, the metadata associated with the digital content identifies the set of effects applied to the received digital content prior to the distribution.

Other entities such as users in a network environment can download and playback the modified digital content. Based on retrieval of the metadata associated with the modified digital content, other entities in the network environment can identify which effects were applied to received digital content and apply the same effects to other content for subsequent distribution in the network environment. Accordingly, embodiments herein facilitate distribution and reuse of playback effects by many users in a computer network environment.

Figure 1:
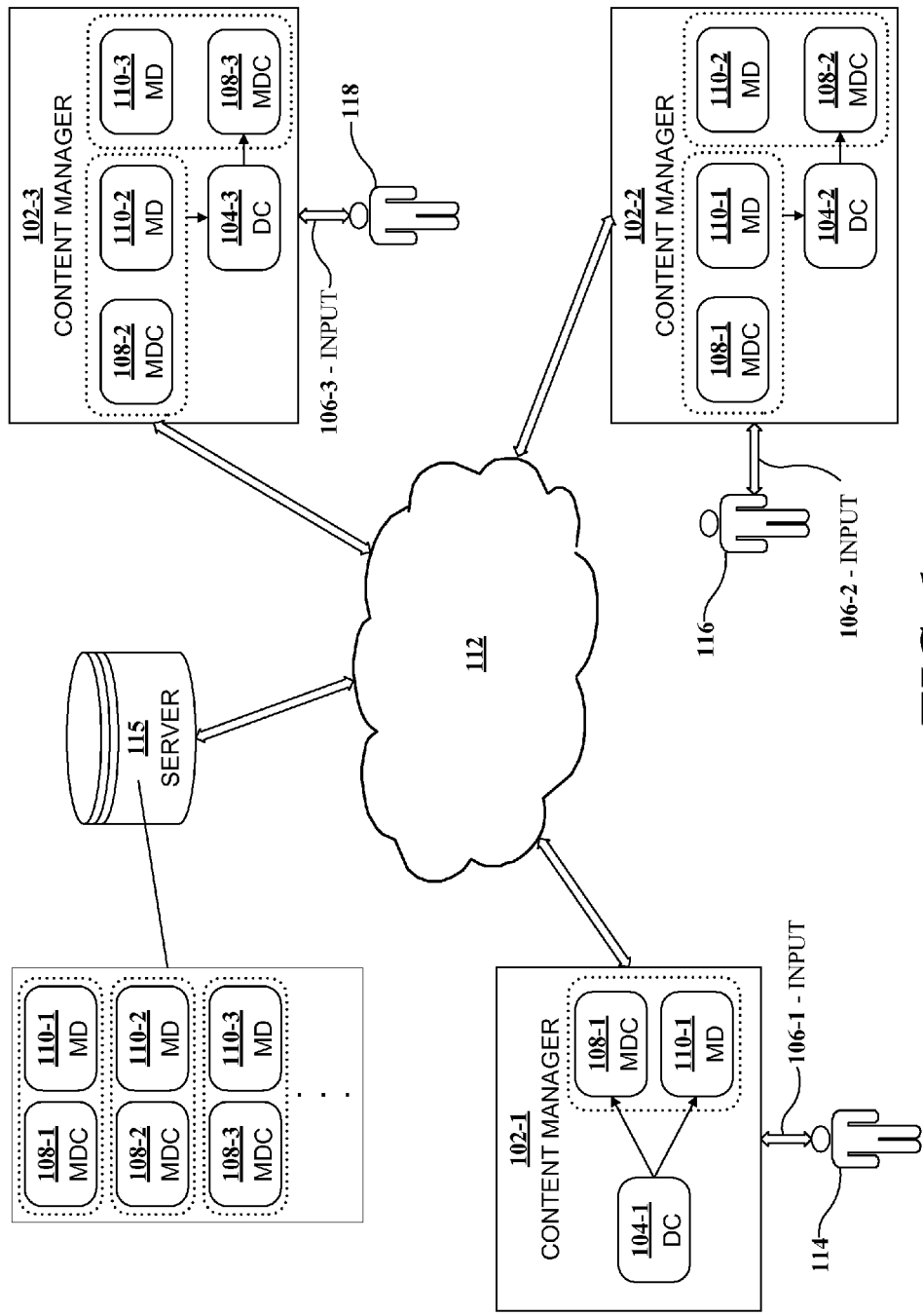
FIG. 1 is an example diagram illustrating a content manager and distribution of content and metadata in a computer/network environment according to embodiments disclosed herein.

More specifically, FIG. 1 is an example diagram illustrating use of a content manager 102 in a computer/network environment 100 according to embodiments disclosed herein. Computer/network environment 100 includes network 112, server 115, content manager 102-1 operated by an entity such as user 114, content manager 102-2 operated by an entity such as user 116, content manager 102-3 operated by an entity such as user 118, etc.

In general, the content managers 102 enable respective users to modify content locally via application of one or more playback effects and upload modified content to server 115 for further distribution in network 112. In one embodiment, as mentioned above, the modified content uploaded to server 115 includes corresponding metadata specifying any playback effects that were used to produce the modified content. Each of the content manager 102 can include a media player enabling a corresponding user to playback content retrieved from server 115.

More specifically, assume that content manager 102-1 receives input 106-1 from user 114 identifying one or more playback effects the user 114 desires to apply to digital content 104-1. By way of a non-limiting example, the digital content can be any type of digital data such as video data, audio data, image data, graphics data, etc. Digital content 104-1 can be retrieved from a number of different devices, such as from a server, from a local repository associated with the content manager 102-1, etc.

By way of a non-limiting example, the different types of effects applied to the digital content can include alpha glow, blur, ghosting, color filtering, brightness modification, contrast modification, etc.

The content manager 102-1 applies the identified one or more effects to the digital content 104-1 as specified by the input 106-1 to produce modified digital content 108-1. By way of a non-limiting example, effects can include different types of sensory effects such as audio effects, video effects, graphic effects, image effects, etc. Via application of one or more different sensory effects to content, an editor such as user 114 is able to control how content, when played back, is rendered by a media player application.

In addition to producing the modified digital content 108-1 based on application of a selected set of sensory effects to original content such as digital content 104-1, the content manager 102-1 produces metadata 110-1. The content manager 102-1 stores, in the metadata 110-1, the identified effect(s) that the content manager 102-1 applies to the digital content 104-1 to produce the modified digital content 108-1.

As an example, the content manager 102-1 can receive an identity of a specific editor application from an entity such as user 106-1. In response to receiving the identity, the content manager 102-1 initiates execution of a corresponding editor application.

Via the editor application, an entity such as a user can specify content to be modified. As will be discussed in more detail in other figures such as FIGS. 4-5, the entity can select one or more types of effects to be applied to the specified content. For each selected effect, the entity can specify a parameter setting for the effect.

As an example, suppose that the entity is a user that selects a blur effect that allows applying different degrees of blurring to a selected image. In such an embodiment, the user would select the blurring effect from, for example, a listing of possible effects displayed by the editor application.

Assume that the user can specify a parameter setting such as a degree to which a selected image can be blurred. In such an embodiment, the editor application can present the user with a list of possible parameter settings between 0% and 100% for applying to the selected effect. In another embodiment, the editor application can display a data field for inputting a numerical value representing the parameter setting.

Assume that 0% corresponds to no blurring of the image while 100% causes complete blurring of the image. In this example, assume the entity provides input to the editor application in, for example, a data field of a display screen to select a value such as 20% for the blur parameter. The editor application then uses the selected effect and parameter information to apply the specified effect such as 20% blurring to the image.

Note that each effect may not require the user to specify a value within a range of parameters as the effect itself may be either only ON or OFF without a possibility of setting it to an in-between state.

Also note that in one embodiment, the storing of the identified effects into corresponding metadata may be transparent to an entity such as a user, computer, etc., applying the effects to corresponding content. In such an embodiment, the content manager 102-1 can automatically store information related to effects into metadata when the effects are entered, chosen, or identified, without the entity being required to expressly instruct the content manager 102-1 to store the effects in the metadata. In this manner, the content manager 102-1 can log effects automatically as an entity applies the effects to corresponding content.

Note that modification of the digital content 104-1 as discussed above can include modifying source data of the digital content 104-1 from its original form into a new form that takes into account the applied sensory effects so that a corresponding media player receiving the modified digital content 108-1 plays back such content including the effects without having to refer to or use the metadata 110-1. In other words, the metadata 110-1 associated with modified digital content 108-1 may not be essential for playback of the modified digital content 108-1 because the modified digital content 108-1 already includes modifications as specified by the metadata 110-1.

The metadata 110-1 specifies the effects used to produce modified digital content 108-1 and can be used for notifying other users of the effects applied to produce modified digital content 108-1. Accordingly, a respective user can easily identify the different sensory effects applied to produce corresponding digital content.

Thus, prior to the distribution of any content such as modified digital content 108-1 and independently of a step of associating the metadata 110-1 with the modified digital content 108-1, the content manager 102-1 can encode or modify original digital content such as content 104-1 in accordance with a specified set of effects to produce the modified digital content 108-1.

Note again that the content manager 102-1 can keep track of the effects applied to corresponding content and store a description of such effects in corresponding metadata. For example, the storing of the identified effects into corresponding metadata may be transparent to an entity such as a user, computer, etc., applying the effects to corresponding content. More specifically, the content manager 102-1 can keep track of the effects applied to corresponding content and store a description of the applied effects and any related parameter information as corresponding metadata associated with the content being modified.

In particular embodiments, the content manager 102-1 stores metadata 110-1 in the same file as the modified digital content 108-1. For example, the metadata 110-1 can be stored in a predetermined location of a file including the modified digital content 108-1.

In other embodiments, the metadata 110-1 is stored in a file separate than a file in which the modified digital content 108-1 is stored. In either case, however, media players and/or content managers in computer network environment 100 can be configured to identify the different types of information such as whether data is modified digital content or metadata.

A format used by the content manager 102-1 to store the metadata 110-1 may depend on the particular embodiment. In an example embodiment, the content manager 102-1 stores the metadata 110-1 using the Extensible Markup Language (XML) format.

After completing a process of producing modified digital content 108-1 and metadata 110-1, the user 114 can provide input 106 requesting uploading of the modified digital content 108-1 and/or metadata 110-1 to server 115. In one embodiment, the user 114 can specify whether the metadata 110-1 will be uploaded to server 115. Thus, a user can control whether to distribute the metadata 110-1 over network 112 to others.

In response to input 106-1 indicating to distribute the modified digital content 108-1 and metadata 110-1, the content manager 102-1 initiates distribution of the modified digital content 108-1 and the metadata 110-1 over the network 112 to server 112. As shown, the server 115 and thus modified digital content 108-1 and metadata 110-1 are accessible by other entities such as users 116, 118, etc.

In one embodiment, network 112 includes a publicly accessible resource such as the Internet. Thus, many persons can access modified digital content 108-1 and metadata 110-1. In other embodiments, network 112 might a different kind of network, such as a local area network ("LAN"), wide area network, etc. in which there is more limited access to modified digital content 108-1 and metadata 110-1.

By way of a non-limiting example, note that, in addition to transmission of the modified digital content 108-1 and metadata 110-1 to server 115, the content manager 102-1 can initiate distribution of the modified digital content 108-1 and the metadata 110-1 to other entities in computer network environment 100 such as other content managers 102. For example, the user 114 can initiate transmission of the modified digital content 108-1 and metadata 110-1 in an e-mail directly to other users in computer network environment 100. Accordingly, the user 114 has further control as to how the modified digital content 108-1 and metadata 110-1 can be distributed in computer network environment 100.

When uploaded to server 115, the modified digital content 108-1 and the metadata 110-1 are stored for later retrieval by other content managers 102. The other content managers 102-2, 102-3, etc., can then use the metadata 110-1 to apply a set of identified effects to other digital content.

For example, as mentioned above, the content manager 102-1 can upload the modified digital content 108-1 and corresponding metadata 110-1 to server 115. Thereafter, content manager 102-2 accesses server 115 to retrieve modified digital content 108-1. Retrieval of modified digital content 108-1 can include retrieval of metadata 110-1 as well.

Via content manager 102-2, the user 116 can initiate playback of modified digital content 108-1. In such an instance, the user may like the effects associated with modified digital content 108-1 and, based on input 106-2, initiate application of the effects as specified by metadata 110-1 to other content such as digital content 104-2. In other words, the content manager 102-2 can receive one or more commands from the user 116 indicating to modify digital content 104-2 in accordance with a set of effects identified in the received metadata 110-1 to produce new modified digital content 108-2.

Thus, embodiments herein include processing the metadata 110-1 to identify the set of playback effects applied to modified digital content 108-1 and encoding the digital content 104-2 in accordance with the set of effects as specified by metadata 110-1 to convert the digital content 104-2 into modified digital content 108-2.

The user 116 can initiate application of additional effects to digital content 104-2 as well. The additional effects can include effects not specified by metadata 110-1. The content manager 102-2 creates metadata 110-2 to include any of the effects applied to digital content 104-2 to produce modified digital content 108-2.

In a similar manner as discussed above, the content manager 102-2 can distribute, over network 112, the digital content 104-2, the modified digital content 108-1, the modified digital content 108-2, and the metadata 110-1.

In one embodiment, the content manager 102-2 initiates distribution of modified digital content 108-2 and corresponding metadata 110-2 over network 112 to server 115. As mentioned, the metadata 110-2 identifies the effects applied to produce modified digital content 108-2. Accordingly, metadata 110-2 provides notification of different effects associated with modified digital content 108-2. The other users can then use the metadata 110-2 to identify a set of effects associated with modified digital content 108-2 for application to other content.

For example, based on input 106-3 from user 118, content manager 102-3 can initiate retrieval of information such as modified digital content 108-1, metadata 110-1, modified digital content 108-2, metadata 110-2, etc. from server 115.

In a similar manner as previously discussed, the content manager 102-3 can download modified digital content 108-1, modified digital content 108-2, etc. The user 118 may like the effects applied to retrieved content and, based on respective metadata, initiate application of the same effects to other digital content to produce modified digital content 108-3.

As an example, assume that the content manager 102-3 retrieves modified digital content 108-2 and, based on playback of modified digital content 108-2, the user 118 likes the applied effects. In such an instance, the user 118 can initiate application of the effects as specified by metadata 110-2 to digital content 104-3. The content manager 102-3 then applies the effects to digital content 104-3 to produce modified digital content 108-3. During such a process, the content manager 102-3 creates metadata 110-3 for distribution along with modified digital content 108-3 in a similar manner as discussed above for other distributed content. Metadata 110-3 indicates one or more effects used to produce modified digital content 108-3.

Thus, embodiments herein include transmitting modified digital content and corresponding metadata over the network 112 to one or more publicly accessible servers such as server 115 to enable retrieval of the modified digital content and the metadata by other clients such as content manager 102-2, content manager 102-3, etc., in the network 112. The other content managers can, in turn, utilize the metadata to apply the set of effects as specified by the metadata to other content subsequently forwarded to and distributed by the one or more publicly accessible servers.

In this way, the content managers 102 and network 112 enable and promote reuse or subsequent application of a same set or modified set of effects to other content by one or more users.

In one embodiment, note that the metadata 110 can be distributed as encrypted data. Content managers 102 in computer network environment 100 having an appropriate decryption key can decrypt the metadata 110 associated with modified digital content 108 to identify what effects were used to produce the respective modified digital content 108. The modified digital content also can be encrypted in a similar manner to prevent playback by unauthorized media players.

In another embodiment, note that the metadata 110 can be distributed as encrypted data while the modified digital content 108 is distributed as unencrypted data. In such an embodiment, any of the content managers 102 in computer network environment 100 can playback the modified digital content with a corresponding media player. However, only content managers having an appropriate decryption key can have the ability to perform functions such as decrypting the metadata and displaying effects as specified by corresponding metadata, applying effects as specified by the metadata to other content, etc.

By way of a non-limiting example, content manager 102-2 can receive metadata 110-1 as encrypted data. Content manager 102-2 can receive modified content 108-1 as unencrypted data. In a manner as discussed above, the content manager 102-2 can be configured with the appropriate decryption key to decrypt metadata 110-1 and access the different effect information specifying the effects applied to produce modified content 108-1.

Content manager 102-3 also can receive metadata 110-1 as encrypted data and receive modified content 108-1 as unencrypted data. However, unlike content manager 102-2, the content manager 102-3 may not be configured with the appropriate decryption key to decrypt metadata 110-1 and access the effects information indicating effects applied to produce modified content 108-1. Thus, content manager 102-3 can play back modified content 108-1, but cannot view the effects information in metadata 110-1. Thus, modified content 108-1 can be played by any of the media players. The metadata 110-1 associated with modified content 108-1 can be viewed only by media players or content managers 102 having an appropriate decryption key. A respective content manager 102 can be configured to include a corresponding decryption key based on downloading of a decryption key during a process of downloading corresponding content manager software on a computer. In other embodiments, the downloaded content manager software may not include a decryption key for decrypting encrypted metadata. In such an instance, an entity such as a user of a respective content manager can obtain a decryption by communicating with a respective key server that distributes such decryption keys. Obtaining a decryption key may require that a user subscribe to a particular service, pay a fee, etc.

In particular embodiments, regardless of whether the metadata 110 is encrypted or not, content managers 102 can produce corresponding metadata 110 to include an identifier of a specific application, such as an editor application for example, that was used to create the effects in corresponding modified content. The identifier can be a GUID (Globally Unique Identifier) or other indicator. Via inclusion of the identifier, the metadata 110 can specify a name, type, etc., of an editor application, such as "Adobe After Effects," for example that was used to apply the effects to the content. In addition to the identifier, a respective content manager 102 can create the metadata to include the identification of a specific application and corresponding version number of a respective editor application.

In particular embodiments, a content manager may only allow the same specific application that created particular digital content to interpret the corresponding metadata to identify the effects used. In other words, by way of a non-limiting example, assume that Adobe After Effects™ was used to create modified content 108-1. In such an embodiment, only the same type of editing applications or content manager 102 configured with Adobe After Effects™ that was used to create the modified content 108 will have the key to decrypt and then access, interpret, view, etc., the corresponding metadata 110 to identify effects applied to corresponding content. Thus, if Adobe After Effects™ was used to create the modified content, then only other users of Adobe After Effects™ can access the metadata and identify what effects and parameters were applied to the modified content.

In further embodiments, a respective content manager 102 can produce the metadata associated with modified content to include an identification of a specific user that created the metadata and the corresponding digital content. In this manner, other entities in a respective network environment can identify and communicate with the entity that produced modified content. For example, a second user receiving the metadata information may use the identification of the specific user if the second user has questions or comments concerning the digital content or the effects utilized in creating the digital content. Thus, according to embodiments herein, the metadata can include contact information such as e-mail information, social networking webapge and user information, etc., for contacting the entity or viewing information about the entity that applied the effects to produce the modified content.

Figure 2:
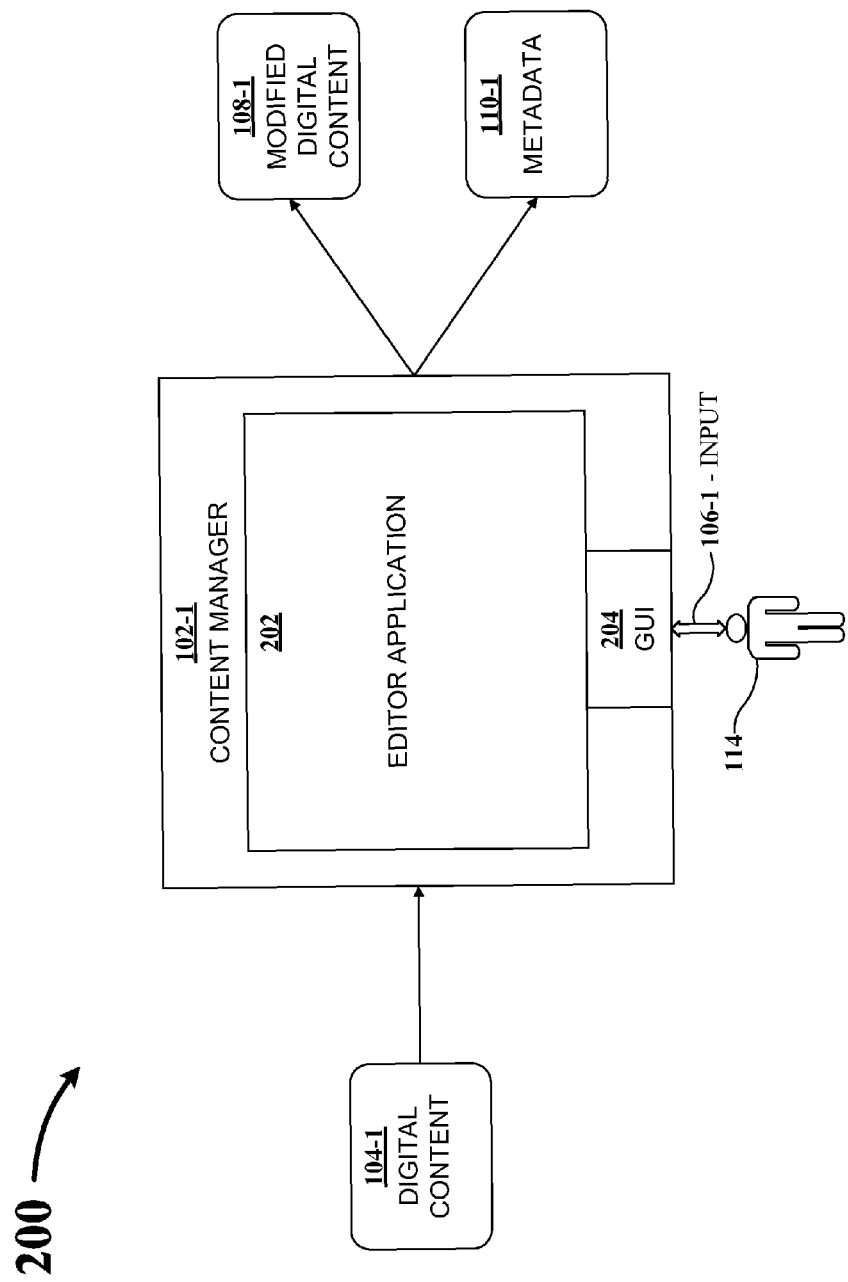
FIG. 2 is an example diagram illustrating an editor application for applying effects to content and generating metadata according to embodiments disclosed herein.

FIG. 2 is an example diagram illustrating the use of an editor application 202 of content manager 102-1 according to embodiments herein. In particular embodiments, the editor application 202 is one of a number of components in a content manager, wherein each component may perform a different function. The content manager 102-1 can include other components such as a graphical user interface or communication related components, and a media player for playback of digital content, modified digital content, etc.

The editor application 202 performs some of the functions discussed above in relation to the first content manager 102-1 of FIG. 1. That is, the editor application 202 receives digital content 104-1 as input. The editor application 202 also receives input 106-1 from the user 114. The received input 106-1 identifies one or more effects the user 114 desires to have applied to digital content 104-1. The editor application 202 applies the identified effect(s) to the digital content 104-1 to produce modified digital content 108-1 and metadata 110-1.

Figure 3:
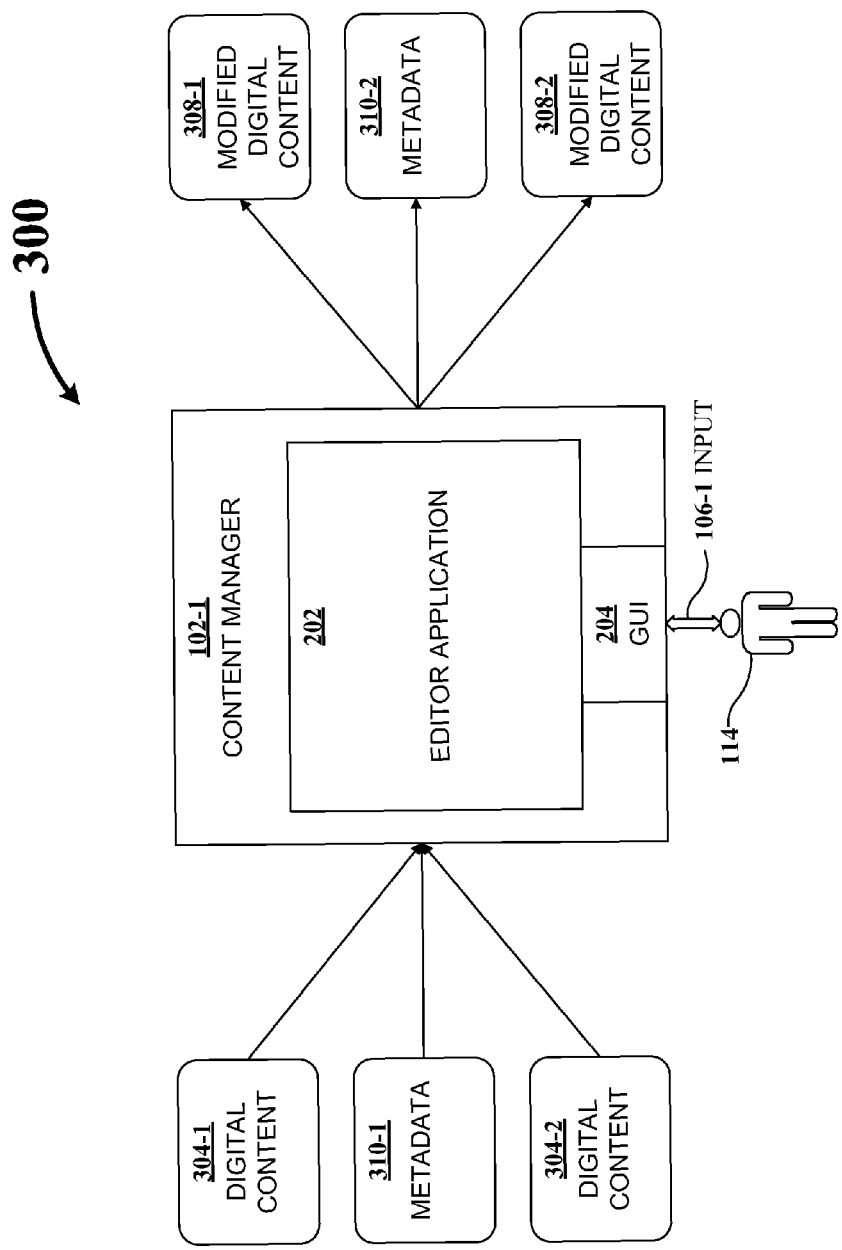
FIG. 3 is another example diagram illustrating an editor application for applying effects to content and creating metadata according to embodiments disclosed herein.

FIG. 3 is another example diagram illustrating the use of an editor application 202 component of a content manager according to embodiments disclosed herein. The editor application 202 receives, as input, a first digital content 304-1, a second digital content 304-2, and metadata 310-1.

The first digital content 304-1 has applied to it one or more effects identified in the metadata 310-1. The editor application 202 can receive input 106-1 from a user 114, wherein the input 106-1 comprises one or more commands. For example, the editor application 202 can receive a command from the user 114 to modify the digital content 304-2 in accordance with a set of effects identified in the received metadata 310-1 to produce new modified digital content 308-1. Also, the editor application 202 can receive a command from the user 114 to modify the metadata 310-1 in accordance with one or more effects received as input 106-1 to produce new metadata 310-2. The editor application 202 can also receive a command from the user 114 to apply the effect(s) in the new metadata 310-2 to any one of the received digital contents 304-1, 304-2 to produce the modified digital content 308-2.

Figure 4:
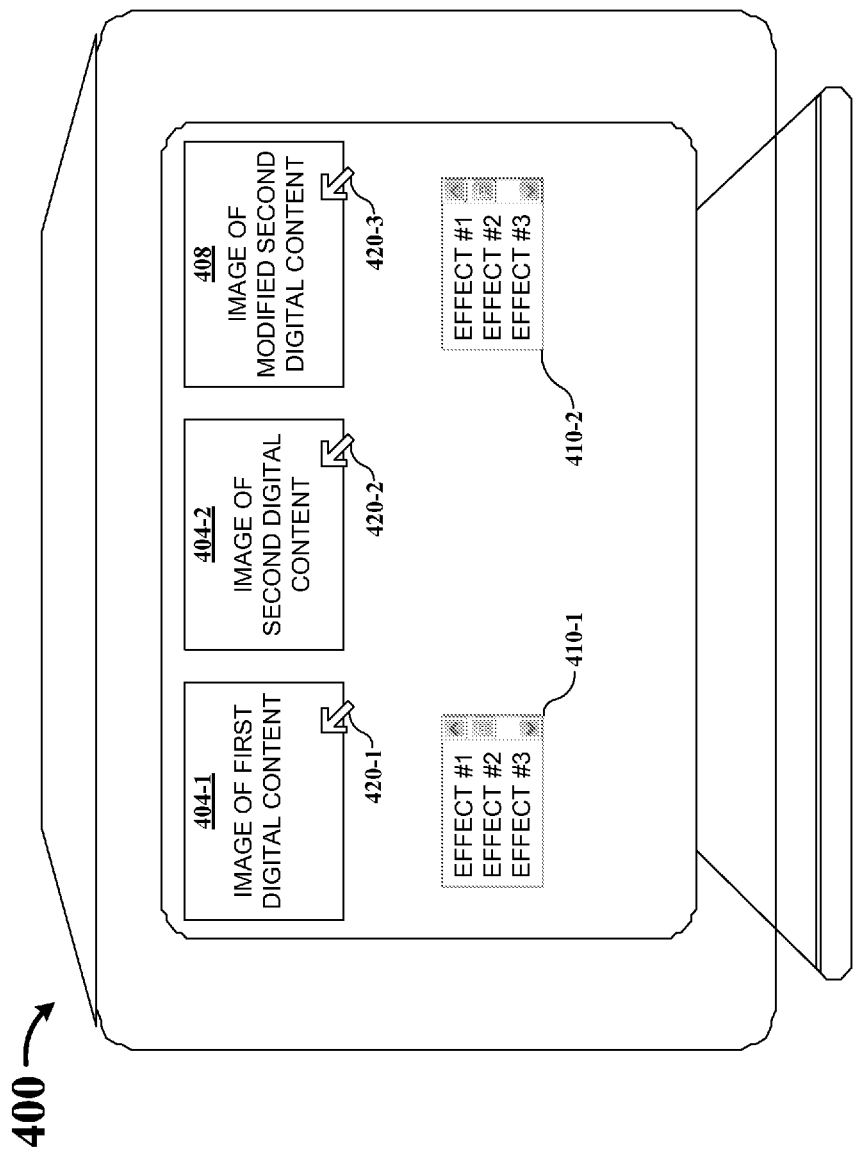
FIG. 4 illustrates an example screenshot of a graphical user interface for managing digital content according to embodiments disclosed herein.

FIG. 4 illustrates an example screenshot 400 for managing digital content according to embodiments disclosed herein. The screenshot 400 includes an image 404-1 of a first digital content. The image 404-1 has metadata associated with it, wherein the metadata contains one or more effects that have been applied to digital content to produce the image 404-1. In particular embodiments, the image 404-1 may be a single frame from a video, thumbnail representative of underlying content, a single still-frame picture such as a snapshot taken with a camera, etc. The metadata can indicate different effects applied to all of the digital content. The metadata also can indicate different effects applied to different frames of the digital content.

When the digital content represented by the image 404-1 is a video, the image 404-1 may have been received by the content manager displaying the screenshot 400 without receiving the entire video. In this manner, a content manager would not be required to retrieve the entire video in order to show a user of the content manager the results of applying the effect(s) identified in the metadata associated with the video. The content manager can instead retrieve and display a single frame of the video. In other particular embodiments, the content manager may receive the entire video and then display the image 404-1 representing a single frame.

A user can display contents of the metadata such as a set of effects applied to produce corresponding modified digital content associated with the image 404-1 by positioning a cursor 420-1 over the image 404-1 and entering a command indicating to the content manager to identify the associated effects. In particular embodiments, the user may enter a view command by right-clicking on a computer mouse used to position the cursor 420-1 over the image 404-1 and selecting a menu option.

Other techniques known in the art of graphical user interfaces may be employed to allow a user to select and view a set of effects in metadata associated with the image 404-1.

Thus, a content manager can indicate contents of the associated metadata by displaying them to a user. The screenshot 400 shows a display region 410-1 of effects in the metadata associated with the image of the first digital content 404-1. The user can select an effect in display region 410-1 and apply the selected effect to other digital content. One way to carry out such a function is to drag and drop an effect from display region 410-1 to another image or symbol in screenshot 400 representing other digital content.

The content manager may receive input indicating the content manager should apply a selected set of effects to a second digital content to produce a modified version of the second digital content. For example, by positioning a cursor 420-2 over the image of the second digital content 404-2 and entering a command, a user may indicate to the content manager to apply the effects shown in the display 410-1 to the second digital content associated with the image 404-2 to produce modified digital content and display an image associated with the modified digital content 408. The content manager can display 410-2 the effects associated with the image of the modified digital content 408 in a manner similar to that used to display 410-1 the effects associated the image of the first digital content 404-1. Thus, a user can view what effects have been applied to produce the modified digital content represented by image 408.

In another embodiment, the user can click on a corresponding symbol representing modified digital content 108-1 to select all of the effects applied to produce the modified digital content 108-1. In response to the selection, the content manager 102-2 can access metadata 110-2 to identify the effects associated with modified digital content 108-1 and place them in a buffer. Thereafter, the user can input an "apply" command by clicking on a symbol of another set of digital content. In response to such a command, the content manager applies all of the effects to the digital content to produce modified digital content as previously discussed above. In a manner as discussed above, the content manager can apply the effects to produce corresponding modified digital content to produce metadata associated with the modified digital content. Thus, a user can use the metadata to easily apply effects to any digital content.

Figure 5:
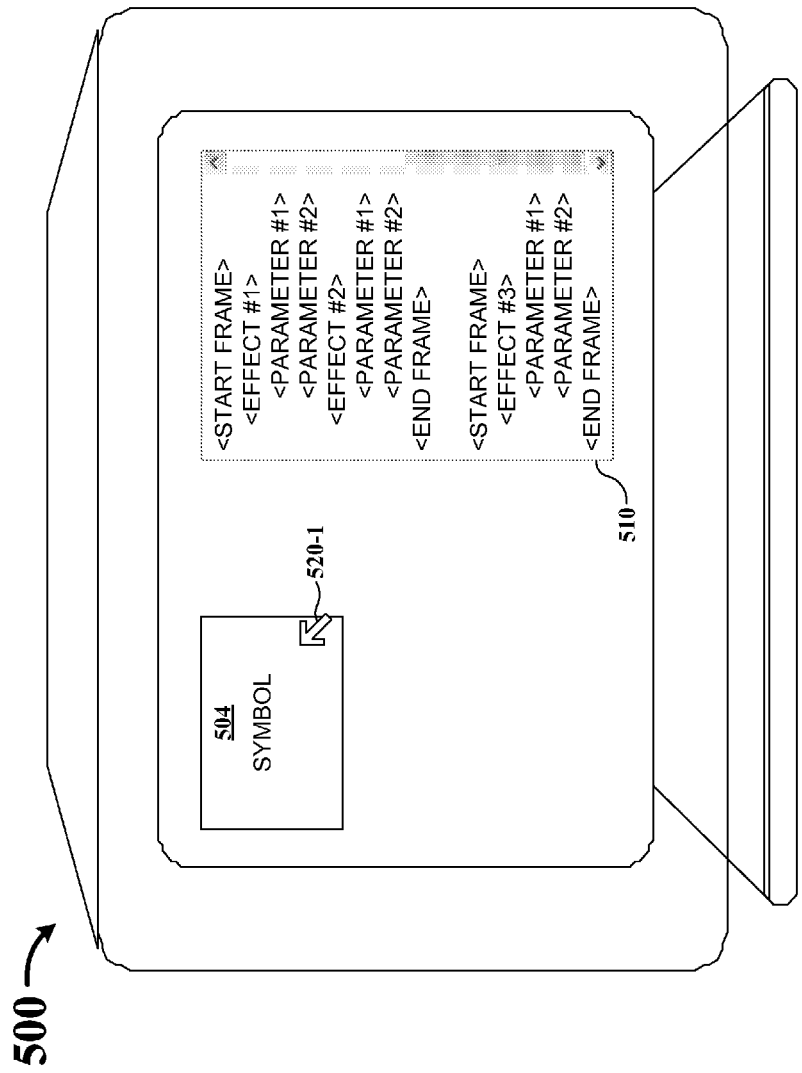
FIG. 5 illustrates another example screenshot of a graphical user interface for managing digital content according to embodiments disclosed herein.

FIG. 5 illustrates another example screenshot 500 for managing digital content according to embodiments disclosed herein. The screenshot 500 includes a display region to display a symbol 504 representing corresponding modified digital content. By way of a non-limiting example, symbol 504 can be a thumbnail, text, etc. representing modified digital content retrieved over network 112.

The modified digital content as represented by symbol 504 can have corresponding metadata associated with it. For example, as previously discussed, such metadata can indicate one or more effects that have been applied to digital content to produce the modified digital content that the symbol 504 represents.

Assume in this example that a user initiates retrieval of modified digital content and metadata. In such an embodiment, the corresponding content manager initiates display of symbol 504 to represent the retrieved modified digital content. In response to selection such as clicking on the symbol 504, the user can initiate playback of the modified digital content as represented by the symbol 504.

A user can initiate display of the metadata such as a set of effects associated with the modified digital content represented by symbol 504 by positioning a cursor 520-1 over the symbol 504 and entering a command indicating to the content manager to display the associated effects as specified by the metadata.

By way of a non-limiting example, the user may enter the command by right-clicking on a computer mouse used to position the cursor 520-1 over the symbol 504 and selecting an item in a pull-down menu listing command options. Note that other techniques known in the art of graphical user interfaces may be employed to allow a user to select one or more effects from a set of effects in metadata associated with the symbol 504.

Thus, for video having multiple frames that have been modified, a user can initiate display of metadata specifying the applied affects at different respective play times of the modified digital content.

For example, in response to clicking on symbol 504, the content manager can initiate display of the corresponding metadata of applied effects including play times when the effects were applied as follows:

```
            GUID = 23456
            < Start Time = 0>
                <Effect 1>
                    <Parameter 1>
                    <Parameter 2>
                <Effect 2>
                    <Parameter 1>
                    <Parameter 2>
            <End Time = 30>
            <Start Time = 31>
                <Effect 3>
                    <Parameter 1>
                    <Parameter 2>
                <Effect 4>
                    <Parameter 1>
                    <Parameter 2>
            <End Time = 60>
```

As previously discussed, note again that the metadata 110 associated with modified content 108 can include a GUID specifying an editor type and/or version used to create and/or apply the effects. By way of a non-limiting example, the GUID can specify different types of editor applications such as Adobe After Effects CS3™, Windows™, Version 1.x.x.x, etc. Other content managers receiving the metadata can then use the GUID to identify which type of application was used to generate the modified content and corresponding metadata.

According to another embodiment, the content manager can initiate display of the applied effects as specified by corresponding metadata based on frame information associated with the corresponding digital content:

```
            < Start Frame No = 0>
                <Effect 1>
                    <Parameter 1-1>
                    <Parameter 1-2>
                <Effect 2>
                    <Parameter 2-1>
                    <Parameter 2-2>
            <End Frame No. = 30>
            <Start Frame No. = 31>
                <Effect 3>
                    <Parameter 3-1>
                    <Parameter 3-2>
                <Effect 4>
                    <Parameter 3-1>
                    <Parameter 3-2>
            <End Frame No.= 60>
```

In either case, the content manager initiates display of the range of frames to which the different effects were applied to produce the modified digital content. Additionally, the content manager displays the parameter settings such as parameter 1, parameter 2, etc. for each of the different effects.

As previously discussed, the content manager can apply different effects as specified by metadata by accessing the metadata and displaying the identified effects in display region 510. For example, in display region 510, the screenshot 500 shows effects as specified by the metadata as well as parameters associated with the effects. Thus, a viewer can view the effects and specific chosen parameters that were used to create the corresponding modified digital content as represented by symbol 504.

The content manager may receive input indicating that a user wishes to modify the effects as shown in display region 510 as specified by the metadata. The content manager can enable a user to enter one or more commands instructing the content manager to modify effects in display region 510 in accordance with the user input.

For example, a user may wish to delete one or more of the displayed 510 effects or may wish to add one or more new effects to the metadata. Additionally, a user may wish to alter one or more aspects associated with an effect. For example, a user may wish to alter when a particular effect starts or when the effect stops. The user can do this by changing the start frame or end frame. If the digital content is a single image (i.e., does not have multiple frames), the start frame and end frame may be identical or may be removed entirely. When a video is played, all the frames starting with the specified beginning frame and ending with the specified ending frame will have the effect applied. Other frames in the video will not have the effect applied.

A user may wish to alter an effect by changing the value of a parameter of the effect. For example, if effect #1 is a color filter effect, parameter #2 associated with effect #1 may be, for example, a particular color choice to use when applying the color filter. The user may wish to change the color used in the color filter. The user may change parameter #2 by interacting with the content manager's graphical use interface.

A user may wish to have the parameter of a particular effect change over time. For example, a user may wish to have a blur effect applied to a portion of a video and may wish to have the blur effect gradually decrease over the portion of the video. Thus the user may wish the blur effect to have a value of 100 at frame 0, blur effect to have a value of 90 at frame 1, blur effect to have a value of 80 at frame 2, blur effect to have a value of 70 at frame 3, and blur effect to have a value of 60 at frame 4. In particular embodiments, the user can specify a start frame of 0 and an end frame of 4. Additionally, the user can specify a parameter that indicates that the value of the parameter is to change from 100 to 60 between the start frame (i.e., 0) and the end frame (i.e., 4).

Thus, the parameters values can be changing depending on the current frame number automatically through so-called keyframing. For example, frame blurriness can keep on increasing or decreasing gradually depending on a corresponding frame in a the sequence of frames. Assuming the Effect 1=Blur effect, its parameter value can be automatically increased based on current frame number as follows:

for Frame No. 0, Blur parameter value=100,
    for Frame No. 1, Blur parameter value=90,
    for Frame No. 2, Blur parameter value=80,
    for Frame No. 3, Blur parameter value=70,
    for Frame No. 4, Blur parameter value=60, and so on.

After the user is finished modifying the effects in display region 510, the content manager can store the modified effects as new metadata. The content manager can then apply the effects as specified by the new metadata to a set of digital content and distribute the resulting modified digital content and metadata as described in embodiments disclosed herein.

As previously discussed, the user can click on a symbol representing corresponding modified digital content and view different sets of effects and corresponding parameters applied to the modified digital content. In one embodiment, in response to selection of a particular frame of the modified digital content and a request to view effects used to produce the corresponding frame, the content manager can initiate display of effects applied to the frame. For example, suppose that a user selects to view effects associated with frame number 3. In response to such a command, the content manager initiates display of the following metadata and range of applied effects:

< Start Frame No = 0>
      <Effect 1>
        <Parameter 1-1>
        <Parameter 1-2>
      <Effect 2>
        <Parameter 2-1>
        <Parameter 2-2>
    <End Frame No. = 30>

In addition to the displaying this metadata, the content manager can initiate display of parameter value information at and/or around the time of the specified frame or frame 3 in this example:

for Frame No. 0, Blur parameter value=100,
    for Frame No. 1, Blur parameter value=90,
    for Frame No. 2, Blur parameter value=80,
    for Frame No. 3, Blur parameter value=70,
    for Frame No. 4, Blur parameter value=60, and so on.

Figure 6:
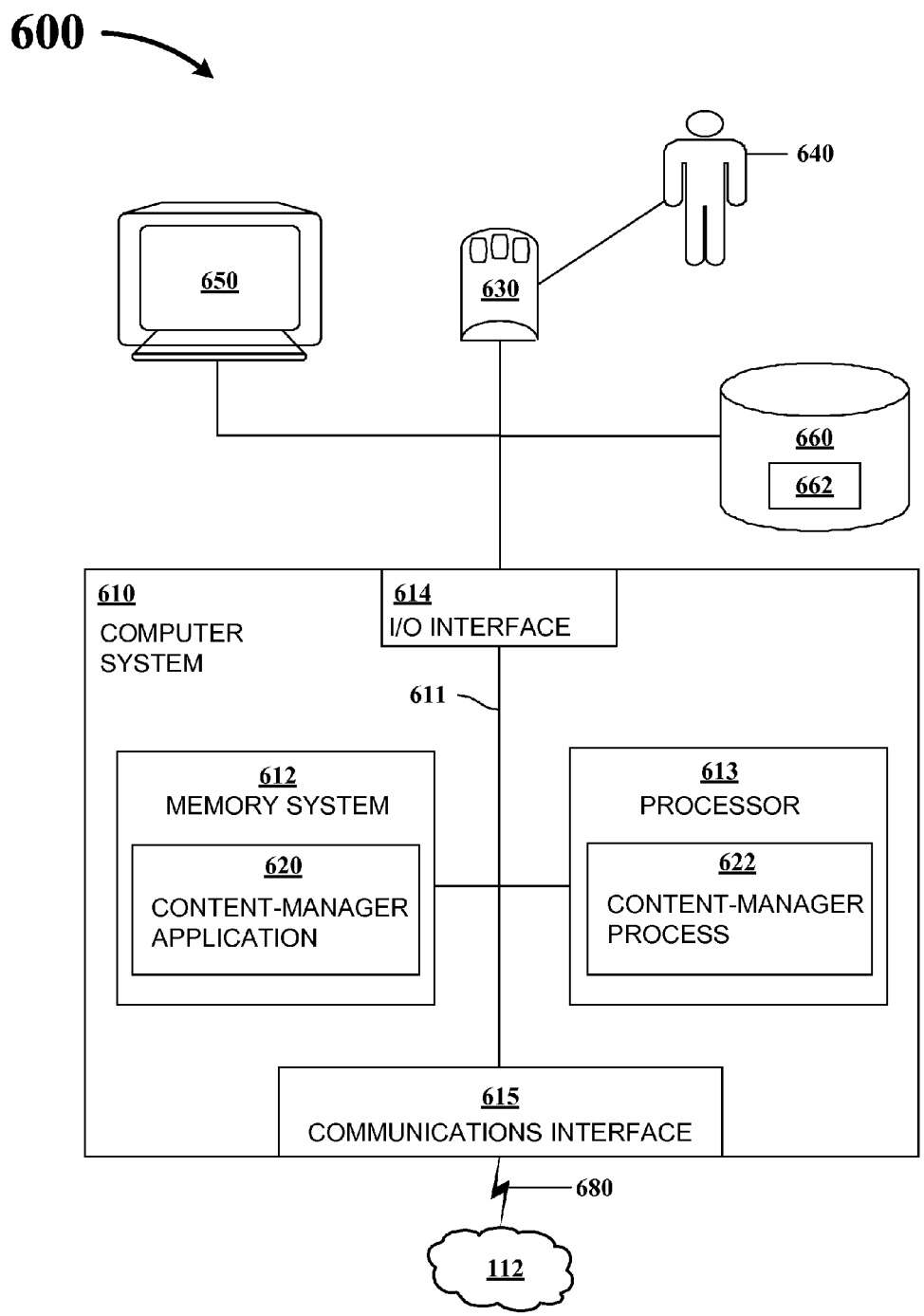
FIG. 6 is an example block diagram of a computer system configured with a processor to execute methods and related storage for storing executable instructions according to embodiments disclosed herein.

FIG. 6 is a block diagram of a computing environment 600 illustrating an example architecture of a respective computer system 610 useful for implementing a content manager according to embodiments disclosed herein. By way of a non-limiting example, computer system 610 can be a computerized device such as a personal computer, workstation, portable computing device, console, network terminal, processing device, etc.

As shown, computer system 610 of the present example includes an interconnect 611, such as a data bus or other circuitry, that couples a memory system 612, a processor 613, I/O interface 614, and a communications interface 615.

An input device 630 such as a keyboard, mouse, touchpad, trackball, etc. couples to the processor 613 through the I/O interface 614 and enables a user 640 of the content manager to provide input commands and generally interact with a graphical user interface that the content-manager application 620 and the content-manager process 622 provide on a display 650.

I/O interface 614 potentially provides connectivity to peripheral devices such as the input device 630, display screen 650, storage device 660, etc. The computer environment 600 includes a storage device 660 that can be used for storing one or more files 662. The files 662 may contain, for example, digital content and metadata as described in accordance with embodiments disclosed herein.

Communications interface 615 enables computer system 610 to communicate with network 112 over the communication link 680 to retrieve and transmit information from remotely located sources if necessary. For example, the computer system 610 may be communicatively connected via the communication link 680 to other content managers on the network 112 or communicatively connected via the communication link 680 to storage devices such as the server 115 discussed herein in relation to FIG. 1.

In this manner, content managers performing operations, such as those described herein, can communicate with each other as well as server 115. For example, the content manager process 622 may produce modified digital content and associated metadata that is sent via the communication link 680 to another content manager or a server connected to the network 112. Similarly, content manager process 622 may receive modified digital content and associated metadata from another content manager or a server connected to the network 112.

As shown, memory system 612 can be any type of computer-readable medium and in this example is encoded with content manager application 620 that supports functionality as herein described. Content manager application 620 can be embodied as computer software code such as data and/or logic instructions or code stored in the memory or on another computer-readable medium such as a disk that supports processing functionality according to different embodiments described herein.

During operation of the computer system 610, processor 613 accesses the memory system 612 via the interconnect 611 in order to launch, run, execute, interpret, or otherwise perform the logic instructions of the content-manager application 620. Execution of the content-manager application 620 produces processing functionality in a content-manager process 622. In other words, the content-manager process 622 represents one or more portions of the content-manager application 620 performing within or upon the processor 613 in the computer system 610. Those skilled in the art will understand that the computer system 610 can include other processes and/or software and hardware components, such as an operating system that controls allocation and use of hardware resources.

It should be noted that, in addition to the content-manager process 622 that carries out method operations as discussed herein, other embodiments herein include the content-manager application 620 itself such as the un-executed or non-performing logic instructions and/or data.

The content-manager application 620 may be stored on a computer-readable medium such as a floppy disk, hard disk, or in an optical medium. According to other embodiments, the content-manager application 620 can also be stored in a memory type system such as in firmware, read-only memory (ROM), or, as in this example, as executable code within the memory system 612 (e.g., within Random Access Memory or RAM). Thus, it should be understood that embodiments disclosed herein include logic encoded in one or more tangible media for execution and, when executed, operable to perform methods and processes disclosed herein. Such logic may be embodied strictly as computer software (e.g., a set of computer programming instructions), as computer software and hardware, or as hardware alone.

Functionality supported by computer system 610 and, more particularly, functionality associated with content-manager application 620 and content-manager process 622 is herein discussed in relation to FIGS. 7-10. For purposes of the following discussion, computer system 610 or a respective content manager 102 generally performs methods and procedures shown in FIGS. 7-10. However, other systems can be configured to provide similar functionality.

FIGS. 7-10 illustrate example operations performable by content managers according to embodiments disclosed herein. It should be noted that the operations illustrated in FIGS. 7-10 and the corresponding text may overlap with and refer to some of the matter previously discussed with respect to FIGS. 1-6. Also, note that the steps in FIGS. 7-10 need not always be executed in the order shown.

Figure 7:
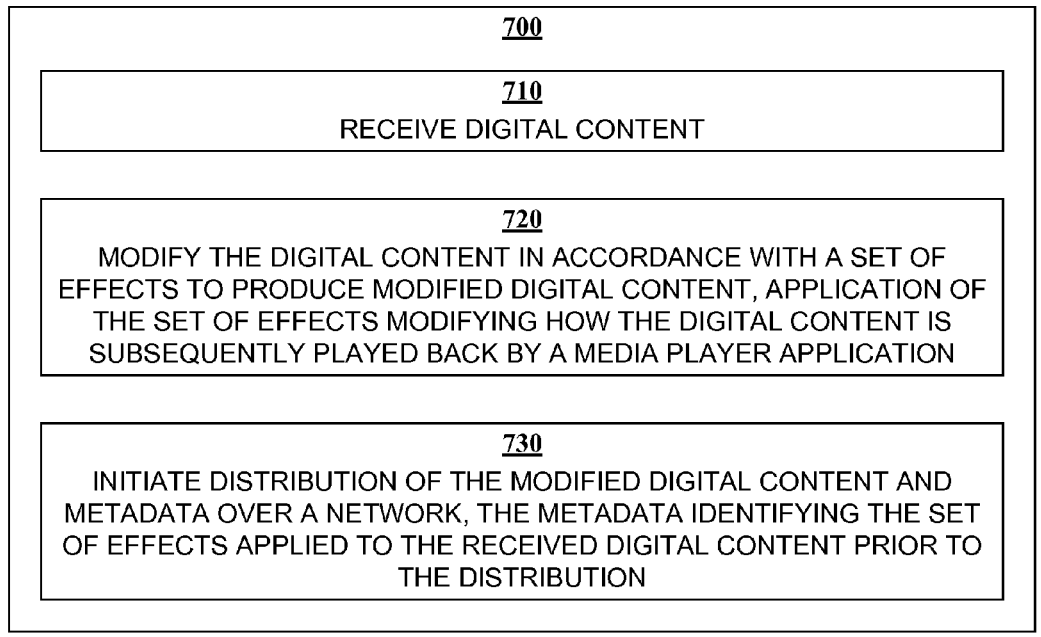

More specifically, FIG. 7 illustrates example operations 700 for managing digital content according to embodiments disclosed herein. In step 710, a content manager receives digital content. In particular embodiments, the received digital content comprises video content. In other particular embodiments, the received digital content comprises a single image.

In step 720, the content manager modifies the digital content in accordance with a set of effects to produce modified digital content. Application of the set of effects modifies how the digital content is subsequently played back by a media player application.

In step 730, the content manager initiates distribution of the modified digital content as well as metadata over a network. The metadata identifies the set of effects applied to the received digital content prior to the distribution over the network.

Figure 8:
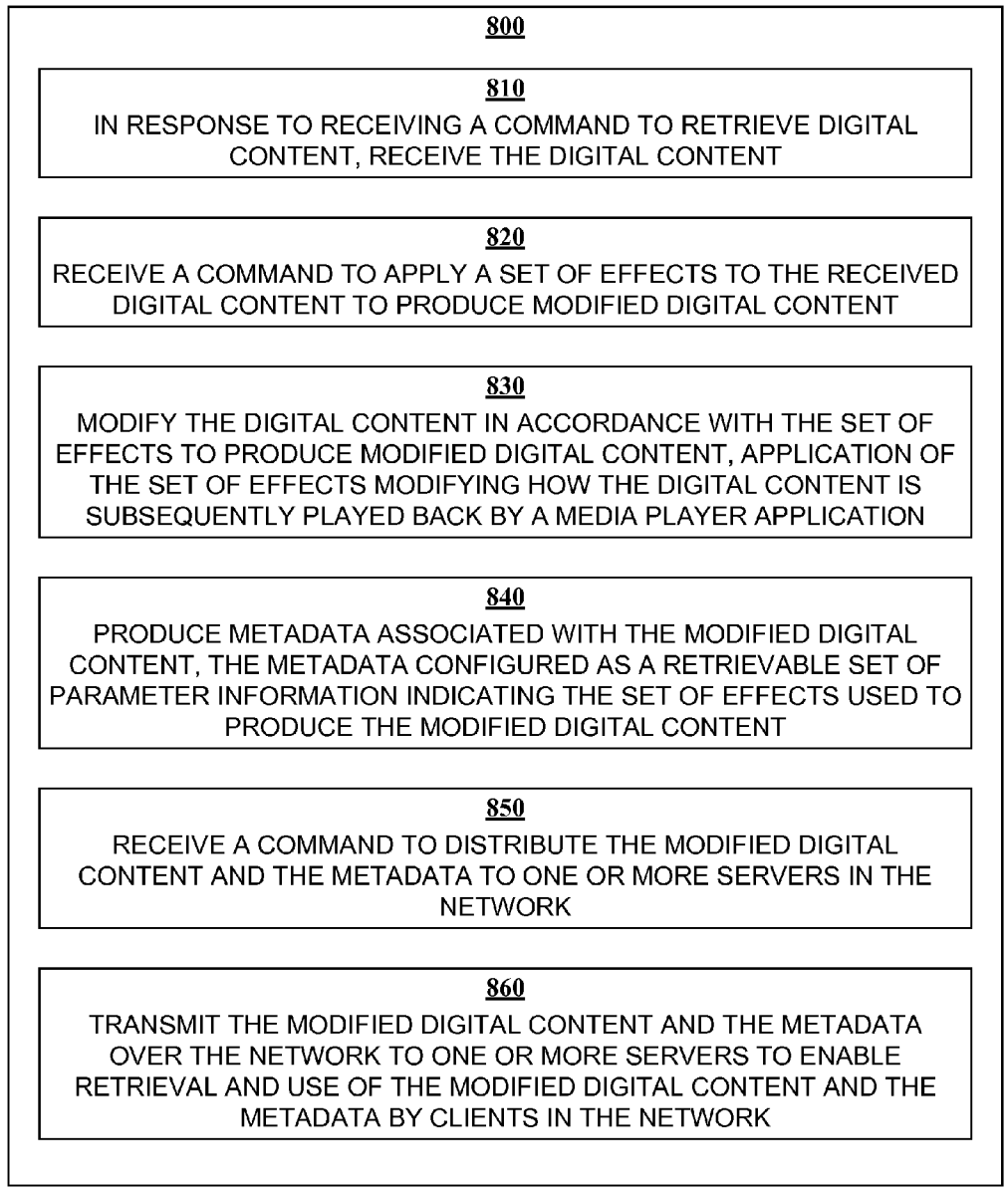

FIG. 8 illustrates additional example operations 800 useful for managing digital content according to embodiments disclosed herein.

In step 810, the content manager receives a command to retrieve digital content. In response to receiving the command to retrieve digital content, the content manager receives the digital content.

In step 820, the content manager receives a command to apply a set of effects to the received digital content to produce modified digital content.

In step 830, the content manager modifies the digital content in accordance with the set of effects to produce modified digital content. Application of the set of effects modifies how the digital content is subsequently played back by a media player application.

In step 840, the content manager produces metadata associated with the modified digital content. The metadata is configured as a retrievable set of parameter information indicating the set of effects used to produce the modified digital content. In particular embodiments, the produced metadata is configured to be retrieved in accordance with FIG. 5 and description herein associated with FIG. 5.

In step 850, the content manager receives a command to distribute the modified digital content and the metadata to one or more servers in the network. For example, a user of the content manager may interact with a graphical user interface to enter the command received by the content manager.

In step 860, the content manager transmits the modified digital content and the metadata over the network to one or more servers to enable retrieval and use of the modified digital content and the metadata by clients in the network. For example, the content manager may initiate distribution of the modified digital content and the metadata over the network 112 as described herein. Clients in the network may include other content managers operating in accordance with embodiments described herein.

FIG. 9 illustrates additional example operations 900 useful for managing digital content according to embodiments disclosed herein.

In step 910, a content manager receives first digital content and first metadata from a first remote source over a network connection. The first metadata identifies a set of playback effects applied to an original set of content to produce the first digital content.

In step 920, in response to receiving a command to apply the set of playback effects to second digital content, the content manager produces a modified version of the second digital content in accordance with the set of playback effects as identified by the first metadata.

In step 930, the content manager initiates distribution of the modified version of the second digital content and second metadata to a second remote source over the network connection. The second metadata identifies playback effects applied to the second digital content prior to the distribution.

Figure 10:
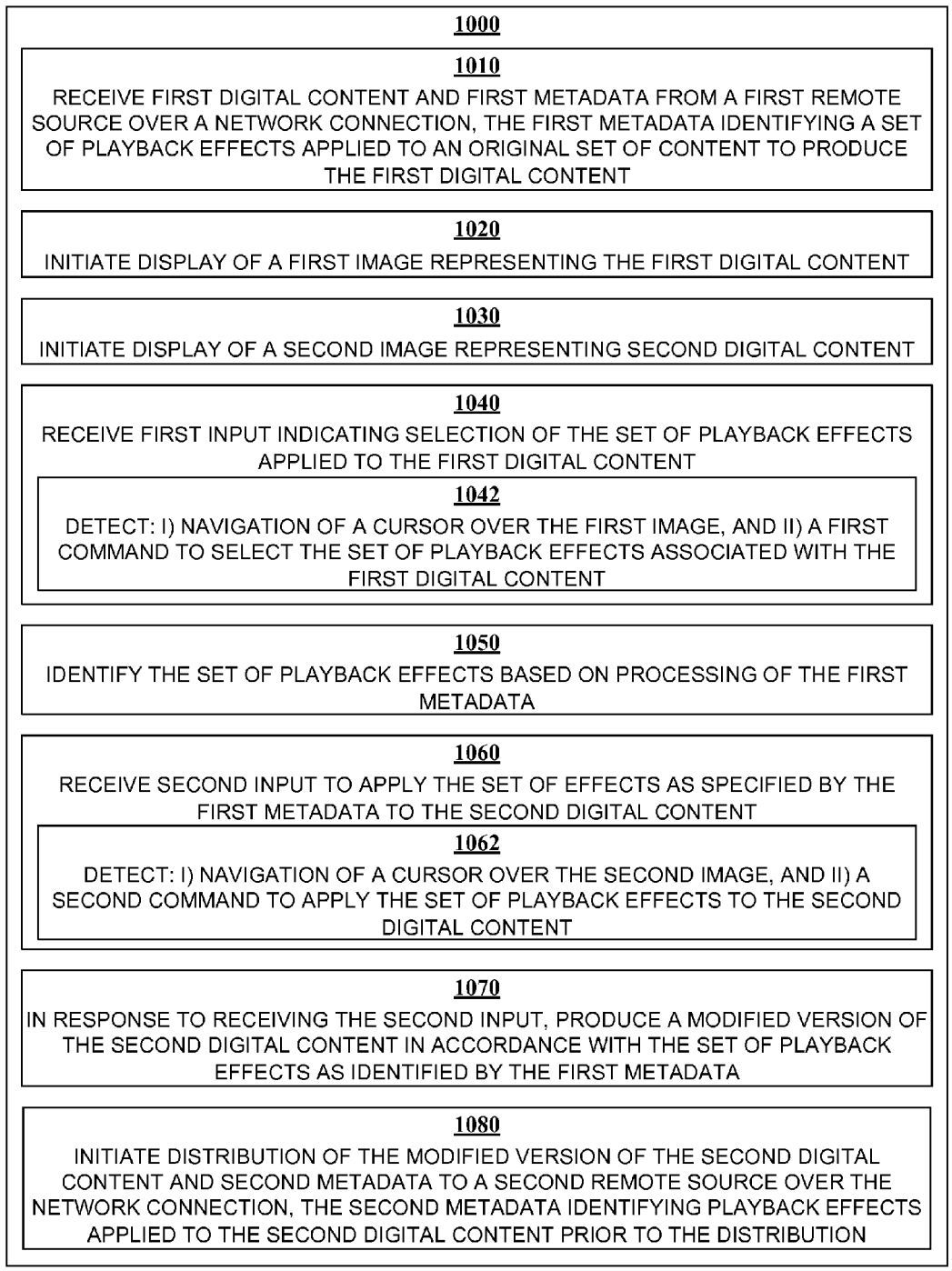

FIG. 10 illustrates additional example operations 1000 useful for managing digital content according to embodiments disclosed herein.

In step 1010, a content manager receives first digital content and first metadata from a first remote source over a network connection. The first metadata identifies a set of playback effects applied to an original set of content to produce the first digital content.

In step 1020, the content manager initiates display of a first image representing the first digital content.

In step 1030, the content manager initiates display of a second image representing second digital content.

In step 1040, the content manager receives first input indicating selection of the set of playback effects applied to the first digital content. The first input may be a result of a user of the content manager interacting with a graphical user interface in accordance with embodiments described herein. For example, in step 1042, the content manager detects navigation of a cursor over the first image and detects a first command to select the set of playback effects associated with the first digital content.

In step 1050, the content manager identifies the set of playback effects based on processing of the first metadata. For example, the content manager may identify the set of playback effects by retrieving the effects from the metadata and displaying the effects in accordance with embodiments described herein.

In step 1060, the content manager receives second input to apply the set of effects as specified by the first metadata to the second digital content. This second input also may be a result of a user of the content manager interacting with a graphical user interface in accordance with embodiments described herein.

For example, in step 1062, the content manager detects navigation of a cursor over the second image and detects a second command. The second command is to apply the set of playback effects to the second digital content.

In step 1070, the content manager responds to receiving the second input. In response to receiving the second input, the content manager produces a modified version of the second digital content in accordance with the set of playback effects as identified by the first metadata.

In step 1080, the content manager initiates distribution of the modified version of the second digital content and second metadata to a second remote source over the network connection. The second metadata identifies playback effects applied to the second digital content prior to the distribution.

Those skilled in the art will understand that there can be many variations made to the operations described herein while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. A method comprising:
receiving first digital content and first metadata from a first remote source over a network connection, the first metadata identifying a set of playback effects applied to an original set of content to produce the first digital content;
receiving a selection of at least one playback effect of the set of playback effects and a selection of an insertion point at any point within a second digital content to apply the selected at least one playback effect beginning at said insertion point, said second digital content different from said first digital content; and
in response to receiving a command to apply the selected at least one playback effect to the selected portion of the second digital content, producing a modified version of the second digital content in accordance with the selected at least one playback effect.

2. The method as in claim 1 further comprising:
initiating display of a first image representing the first digital content;
initiating display of a second image representing the second digital content;
receiving first input indicating selection of the set of playback effects applied to the first digital content; and
identifying the set of playback effects based on processing of the first metadata.

3. The method as in claim 2, wherein receiving first input includes detecting:
i) navigation of a cursor over the first image, and
ii) a first command to select the set of playback effects associated with the first digital content; and
wherein receiving the second input includes detecting:
i) navigation of the cursor over the second image, and
ii) a second command to apply the set of playback effects to the second digital content.

4. The method as in claim 1 further comprising:
receiving a command to apply additional effects to the second digital content in addition to the set of effects applied to the first digital content;
prior to distribution, configuring the second metadata to specify both the set of effects and the additional effects applied to the second digital content to produce the modified version of the second digital content.

5. The method as in claim 1, wherein receiving the first digital content and the first metadata from the first remote source over the network connection includes:
receiving the first metadata as encrypted data; and
receiving the first digital content as unencrypted data.

6. The method as in claim 5 further comprising:
decrypting the first metadata to identify the set of playback effects applied to produce the first digital content.

7. The method as in claim 1, wherein receiving the first metadata includes:
receiving an identification of a corresponding editor application used to modify the digital content in accordance with the set of playback effects.

8. The method of claim 1, further comprising receiving a modification of the selected at least one playback effect, and producing the modified version of the second digital content in accordance with the modification of the selected at least one playback effect.

9. The method of claim 1, wherein receiving the selection of at least one playback effect and the selection of a portion of second digital content comprises a drag-and-drop command of the at least one playback effect from the first digital content to the second digital content.

10. The method of claim 1, further comprising initiating distribution of the modified version of the second digital content and second metadata to a second remote source over the network connection, the second metadata identifying playback effects applied to the second digital content prior to the distribution.

11. A computer program product including a computer-readable medium having instructions stored thereon for processing data information, such that the instructions, when carried out by a processing device, enable the processing device to perform the operations of:
   receiving first digital content and first metadata from a first remote source over a network connection, the first metadata identifying a set of playback effects applied to an original set of content to produce the first digital content;
   receiving a selection of at least one playback effect of the set of playback effects and a selection of an insertion point at any point within a second digital content to apply the selected at least one playback effect beginning at said insertion point, said second digital content different from said first digital content; and
   in response to receiving a command to apply the selected at least one playback effect to the selected portion of the second digital content, producing a modified version of the second digital content in accordance with the selected at least one playback effect.

12. The computer program product as in claim 11 further including instructions to support operations of:
   initiating display of a first image representing the first digital content;
   initiating display of a second image representing the second digital content;
   receiving first input indicating selection of the set of playback effects applied to the first digital content; and
   identifying the set of playback effects based on processing of the first metadata.

13. The computer program product as in claim 12, wherein receiving first input includes detecting:
   i) navigation of a cursor over the first image, and
   ii) a first command to select the set of playback effects associated with the first digital content; and
   wherein receiving the second input includes detecting:
   i) navigation of the cursor over the second image, and
   ii) a second command to apply the set of playback effects to the second digital content.

14. The computer program product as in claim 12 further including instructions to support operations of:
   receiving a command to apply additional effects to the second digital content in addition to the set of effects applied to the first digital content;
   prior to distribution, configuring the second metadata to specify both the set of effects and the additional effects applied to the second digital content to produce the modified version of the second digital content.

15. The computer program product as in claim 11, wherein receiving the first digital content and the first metadata from the first remote source over the network connection includes:
   receiving the first metadata as encrypted data; and
   receiving the first digital content as unencrypted data.

16. The computer program product as in claim 15 further including instructions to support operations of:
   decrypting the first metadata to identify the set of effects applied to produce the first digital content.

17. The computer program product as in claim 11, wherein receiving the first metadata includes:
   receiving an identification of an entity that modifies the digital content in accordance with the set of playback effects.

18. The computer program product as in claim 11, wherein modifying the second digital content in accordance with the set of playback effects as identified by the first metadata includes:
   processing the first metadata to identify the set of playback effects applied to produce the first digital content; and
   encoding the second digital content in accordance with the set of effects to convert the second digital content into the modified version of the second digital content.

19. The product of claim 11, further comprising receiving a modification of the selected at least one playback effect, and producing the modified version of the second digital content in accordance with the modification of the selected at least one playback effect.

20. The product of claim 11, wherein receiving the selection of at least one playback effect and the selection of a portion of second digital content comprises a drag-and-drop command of the at least one playback effect from the first digital content to the second digital content.

21. The computer program product as in claim 11, having further instructions stored thereon for enabling the processing device to perform the operations of initiating distribution of the modified version of the second digital content and second metadata to a second remote source over the network connection, the second metadata identifying playback effects applied to the second digital content prior to the distribution.

22. A computer system comprising:
   a processor;
   a memory unit that stores instructions associated with an application executed by the processor; and
   an interconnect coupling the processor and the memory unit, enabling the computer system to execute the application and perform operations of:
      receiving first digital content and first metadata from a first remote source over a network connection, the first metadata identifying a set of playback effects applied to an original set of content to produce the first digital content;
      receiving a selection of at least one playback effect of the set of playback effects and an insertion point at any point within a second digital content to apply the selected at least one playback effect beginning at said insertion point, said second digital content different from said first digital content; and
   in response to receiving a command to apply the selected at least one playback effect to the selected portion of the second digital content, producing a modified version of the second digital content in accordance with the set of playback effects as identified by the first metadata.

23. The system of claim 22, further comprising receiving a modification of the selected at least one playback effect, and producing the modified version of the second digital content in accordance with the modification of the selected at least one playback effect.

24. The system of claim 22, wherein receiving the selection of at least one playback effect and the selection of a portion of second digital content comprises a drag-and-drop command of the at least one playback effect from the first digital content to the second digital content.

25. The system of claim 22, wherein the computer system is further configured to perform operations of initiating distribution of the modified version of the second digital content and second metadata to a second remote source over the network connection, the second metadata identifying playback effects applied to the second digital content prior to the distribution.

* * * * *